Aug. 9, 1955
R. E. MORGAN
2,715,203
ELECTRIC MOTOR CONTROL CIRCUIT USING SATURABLE REACTORS
Filed June 17, 1950
3 Sheets-Sheet 1
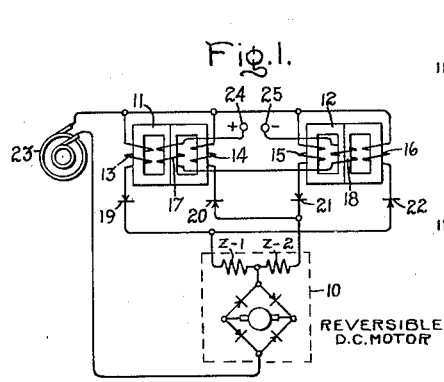
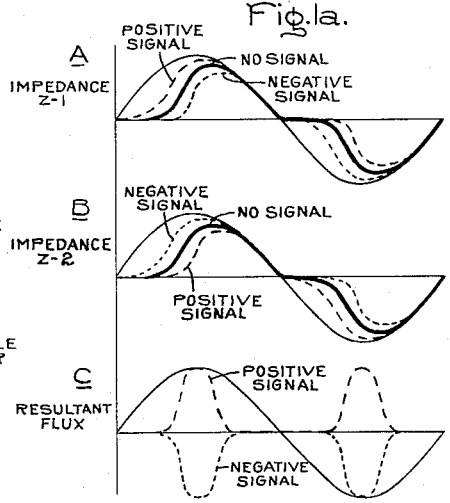
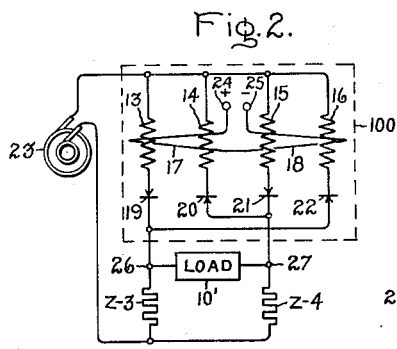
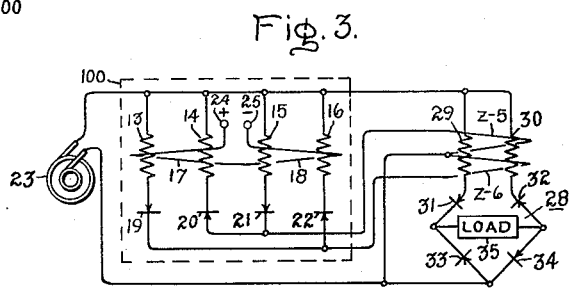
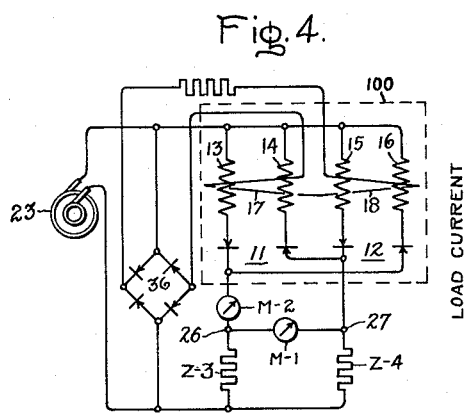
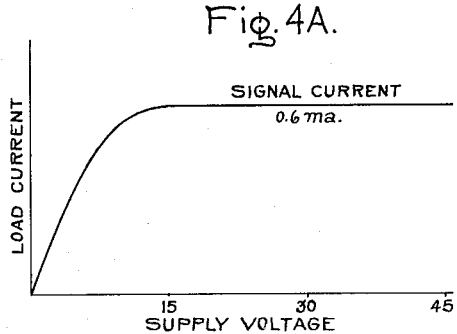
Inventor:
Raymond E. Morgan,
by Paul A. Frank
His Attorney.

Aug. 9, 1955 R. E. MORGAN 2,715,203
ELECTRIC MOTOR CONTROL CIRCUIT USING SATURABLE REACTORS
Filed June 17, 1950 3 Sheets-Sheet 2
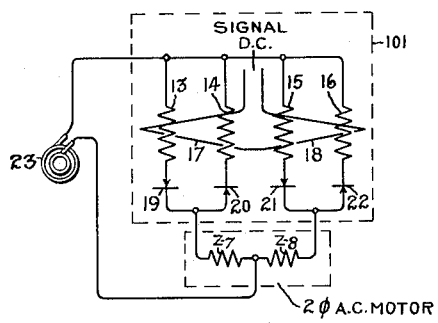
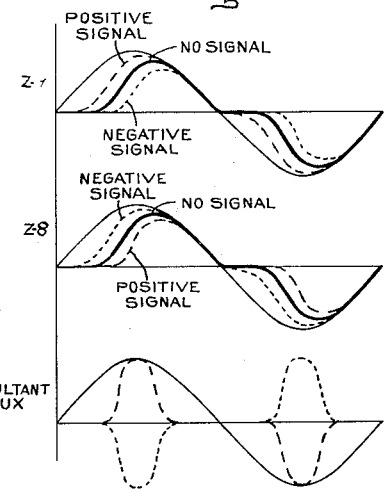
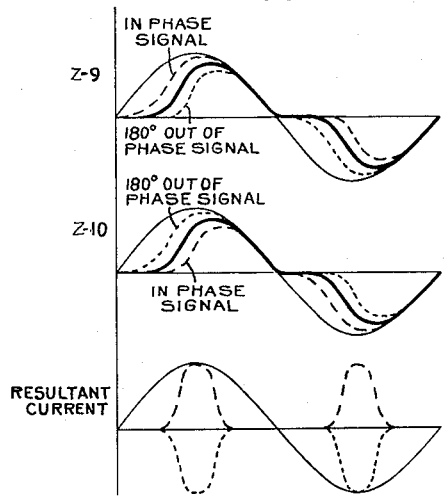
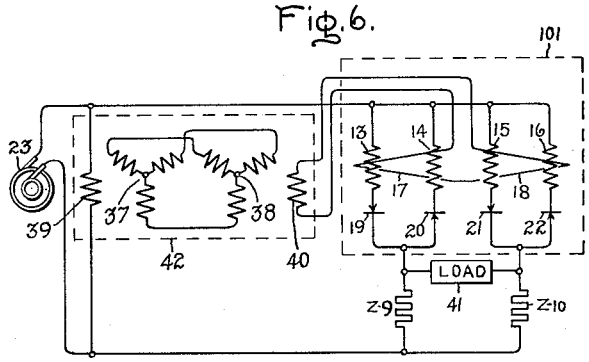
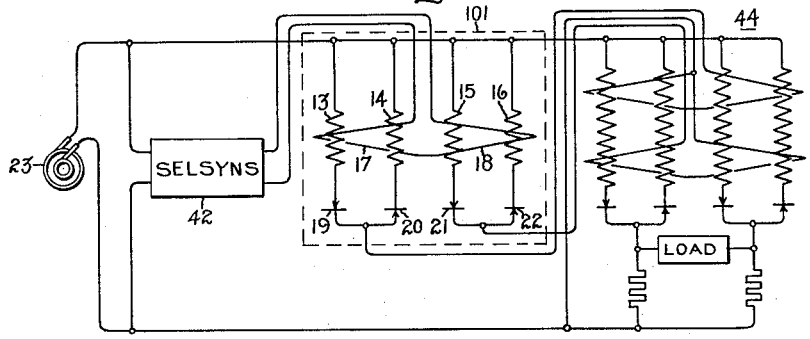
Inventor:
Raymond E. Morgan,
by Paul A. Frank
His Attorney.

Inventor:
Raymond E. Morgan,
by Paul A. Frank
His Attorney.

United States Patent Office 2,715,203
Patented Aug. 9, 1955

2,715,203

ELECTRIC MOTOR CONTROL CIRCUIT USING SATURABLE REACTORS

Raymond E. Morgan, Schenectady, N. Y., assignor to General Electric Company, a corporation of New York Application June 17, 1950, Serial No. 169,847

15 Claims. (Cl. 318—207)

My invention relates to electric control circuits and, more particularly, to electric control circuits which employ saturable reactors as the current controlling elements thereof and which are commonly called "magnetic amplifiers."

In many industrial applications, both in the interest of economy and standardization of equipment, it is often highly desirable to employ an electric control circuit which can be used to fulfill a number of discrete control functions in the particular work to be performed or in the particular apparatus to be built. In conventional radar antenna positioning apparatus for example, electric control circuits are often used to convert a phase-sensitive alternating voltage signal into an amplified polarity-sensitive unidirectional voltage, and vice versa. Simple direct and alternating current amplifiers are also commonly required in such apparatus as well as electric voltage and current regulating circuits. A single versatile control circuit which could easily be adapted to fulfill many of these varied control functions would, of course, considerably simplify the problems of design and maintenance of such apparatus.

In addition, there are certain performance requirements that should preferably be met by any such control circuit. The controlling action of the circuit should be fast, strong and definite within a desired range of input signal; and the limits of the range should be easily adjustable and sharply defined. Moreover, the control action should depend primarily upon the input signal alone and be relatively unaffected by minor changes in supply voltage, frequency, temperature, or aging of the circuit components.

Furthermore, any such control circuit should be able to be assembled within a small space and should, of course, preferably be comprised of economical commercially available components.

Accordingly, an important object of my invention is to provide an electric control circuit using saturable reactors which may be easily adapted to perform a number of different electric controlling and amplifying functions.

In fulfillment of this above-mentioned object it is another object of my invention to provide a saturable reactor type electric control circuit which can be easily adapted to be employed as an amplifier of unidirectional or alternating voltage, as an amplifying converter of phase sensitive alternating voltage into amplified polarity sensitive unidirectional voltage, and vice versa; and also as a constant current reference standard for electric regulating systems.

An additional object of my invention is to provide a saturable reactor type electric amplifying control circuit which has extremely high sensitivity to small input signals and a sharp limiting characteristic to large input signals.

A further object of my invention is to provide a saturable reactor type electric control circuit which is relatively unaffected by minor changes in supply voltage, frequency, temperature, or aging of the circuit components.

A still further object of the invention is to provide a saturable reactor type electric control circuit which is comprised of economical commercially available components and lends itself to a compact structural arrangement.

In general, my invention comprises saturable reactor apparatus having, in total, four reactance windings connected through suitable current rectifying elements in "push-pull" circuit relation with a pair of impedances across an alternating voltage source in a manner such that current reverses through each impedance upon each alternation of the source voltage. These impedances are arranged to energize a load in accordance with the instantaneous differential of the currents in each impedance, and the direction of energization depends upon the preponderance of the current in one impedance over the other. Both the direction and amplitude of this preponderance of current may be controlled by varying time of reactor core saturation caused by one pair of reactance windings in a direction opposite to that produced by the other pair of reactance windings. Such oppositely directed saturation effect is easily achieved in accord with my invention by employing one or more signal receiving saturation control windings arranged on the reactor in a manner producing oppositely directed flux therein relative to the flux produced by the reactance windings during their respective current conducting periods. By proper connection of the current rectifying elements with respect to the impedances, this control circuit can be adapted for use as either an amplifier, or a converter of either unidirectional or alternating currents. In addition, these impedances may comprise the control windings of a further stage of magnetic amplification with the result that this control circuit may be employed as a magnetic "pre-amplifier or may be cascaded to provide greater amplification. Furthermore, if the saturable reactor apparatus in this control circuit is magnetically biased by a large unidirectional control voltage signal, the circuit will show very little variation in output current flow regardless of changes in the amplitude or frequency of the source voltage and, therefore, may be employed as a constant current reference standard for electric regulating systems.

The novel features which I believe to be characteristic of my invention are set forth with particularity in the appended claims. My invention itself, however, together with further objects and advantages thereof, can best be understood by reference to the following description taken in connection with the accompanying drawings in which:

Fig. 1 illustrates my invention in conjunction with a pair of impedances comprising the split field windings of a series connected reversible D. C. motor; Figs. 1a and 1b are curves explanatory of the operation of the control circuit of Fig. 1.

Fig. 2 is a modification of the circuit of Fig. 1 whereby my invention may be employed with any type of electric consumption circuit or "load."

Fig. 3 illustrates the use of the circuit of Fig. 1 as a pre-amplifier for a further stage of magnetic amplification.

Fig. 4 illustrates the use of the circuit of Fig. 1 as a magnetic reference standard for electric regulating systems and Fig. 4a is a curve explanatory of the operation of the magnetic reference circuit of Fig. 4.

Fig. 5 is a modification of the circuit of Fig. 1 whereby it may be adapted for use as a converter of a unidirectional signal to an amplified alternating phase-sensitive output voltage or current, and Fig. 5a is a family of curves explanatory of the operation of the converter of Fig. 5.

Fig. 6 is a circuit diagram illustrating the use of the circuit of Fig. 5 as a discriminator producing an amplified unidirectional output voltage or current whose polarity and magnitude are dependent upon the phase and amplitude of an alternating current signal derived from the alternating voltage source, and Fig. 6a is a family of curves explanatory of the operation of Fig. 6.

Fig. 8 is a modification of the circuit of Fig. 7.

Figure 9:
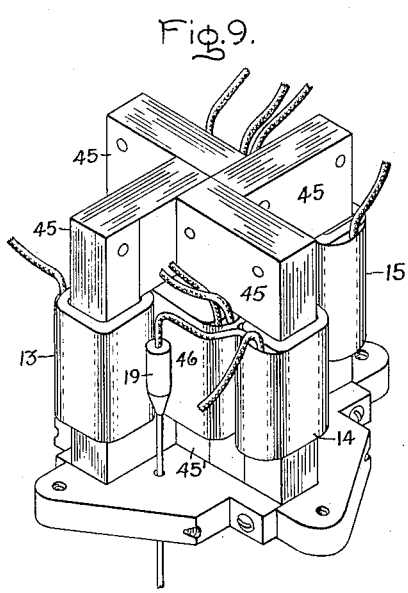
Fig. 9 is a perspective view of a preferred structural arrangement of the control circuit of my invention.

Referring to Fig. 1, I have shown my invention in one form as employed in conjunction with a pair of impedances Z–1 and Z–2, which comprise the split field windings of a reversible D. C. motor, indicated generally within the dashed line 10. The circuit may conveniently employ a pair of saturable reactors 11 and 12, preferably of the bisected three legged type, although a single unified core structure (as shown in Fig. 9) or four separate core members may, of course, alternatively be used. Each of the reactors 11 and 12 have a respective pair of reactance windings 13, 14 and 15, 16 wound on the outside legs thereof and a respective control winding, 17 and 18, wound on its central leg. Each reactance winding is separately connected through a current rectifying element, designated by the numerals 19, 20, 21, and 22, in series with one of the impedances Z–1 and Z–2 across an alternating voltage source 23; reactance windings 13 and 16 being connected in parallel with each other and in series with one impedance Z–1 while reactance windings 14 and 15 are connected in parallel with each other and in series with the other impedance Z–2. Rectifying elements 19 and 20 associated with reactor 11 are reversely poled, while rectifying members 21 and 22 associated with reactor 12 are also reversely poled with respect to each other. It will thus be seen that rectifiers 19 and 21 are similarly poled while rectifiers 20 and 22 are also similarly poled, with the result that current flows through both the impedances Z–1 and Z–2 during both alternations of source voltage but reverse direction together with a reversal in polarity of the source voltage.

In order to control the instantaneous differential of the currents flowing in these two impedances Z–1 and Z–2 during each half cycle of source voltage, the control windings 17 and 18, respectively associated with reactors 11 and 12, are connected in series opposition across a pair of input signal receiving terminals 24, 25. The windings 17 and 18 are arranged relative to the reactance windings with which they are in magnetic circuit relation so as to produce oppositely directed saturation effect in the reactors 11 and 12 when a unidirectional curent flows in these control windings as a result of a signal supplied to the terminals 24 and 25. Although the complete detailed operation of this control circuit will be described hereinafter, it might be well to point out that with no signal supplied to the input terminals 24 and 25, the reactance windings of both reactors 11 and 12 will pass the same amount of current during both alternations of source voltage. However, with a signal of one particular polarity, such as positive, supplied to the terminals 24 and 25, the reactance windings of one reactor will allow a greater current to flow during their alternate conducting periods than the reactance windings of the other reactor. Moreover, due to the parallel connection of one reactance winding in one reactor with a corresponding reactance winding in the other reactor, different magnitude currents flow through each impedance during alternate half cycles of source voltage.

Referring now to Fig. 2, I have shown an alternative manner of connecting the impedances Z–1 and Z–2 in the control circuit of Fig. 1 so that any type of electric consumption circuit or "load" may be employed. In this circuit, the current passing through a pair of impedances Z–3 and Z–4, does not also pass through the load device itself (as through the armature of the series motor 10 shown in Fig. 1). Rather, the consumption circuit, such as load 10' of Fig. 2, comprises a diagonal current conducting path of a bridge circuit and is connected across corresponding impedance points 26 and 27 in series with each impedance Z–3 and Z–4. The remainder of the circuit enclosed within dashed line 100 is identical with that of Fig. 1 and corresponding elements have been designated by similar reference numerals. Impedances Z–3, Z–4 and load 10' constitute the output load network of the circuit of Fig. 2 while D. C. motor 10 including impedances Z–1 and Z–2 constitutes the output load network for the circuit of Fig. 1. It will be noted that in the circuit of Fig. 2, the instantaneous differential of the voltages developed across Z–3 and Z–4 by the respective currents flowing therethrough is the voltage which energizes the load 10. Although in Fig. 2 I have preferably shown Z–3 and Z–4 as comprising resistors rather than field windings as in Fig. 1, it will be appreciated that any type of electric impedance element may be substituted therefor. Either inductive or capacitive elements may be used, and if capacitive elements are used, they may be tuned with the series connected reactance windings of the saturable reactors to resonate at the source voltage frequency in order to provide a greater voltage differential at impedance points 26 and 27.

Referring now to Fig. 3, I have shown my invention as it might be employed in conjunction with a further stage of magnetic amplification. In Fig. 3 a pair of saturation control windings Z–5 and Z–6 of a further stage of magnetic amplification 28 replace the impedances Z–1, Z–2 and Z–3, Z–4 of the circuits of Fig. 1 and Fig. 2 respectively. This further stage of magnetic amplification 28 is shown as a bridge type magnetic amplifier having a pair of reactance windings 29 and 30 connected respectively in series with a pair of reversely poled rectifiers 31 and 32 as balancing arms of a bridge; the other pair of balancing arms being formed by another pair of reversely poled rectifiers 33 and 34 respectively. Any desired load, indicated by block 35, is connected as the diagonal of the bridge. The remainder of this circuit, enclosed within dashed line 100, is identical with that shown in either Figs. 1 or 2, and functions as a pre-amplifier for this second stage of magnetic amplification 28. It will be appreciated that in this circuit of Fig. 3, as in the motor control circuit of Fig. 1, the output load network represented by the second stage of magnetic amplification 28 is energized by the flux due to the instantaneous differential of the currents flowing through the series impedances, represented in Fig. 3 by the control windings Z–5 and Z–6.

Figure 1B:
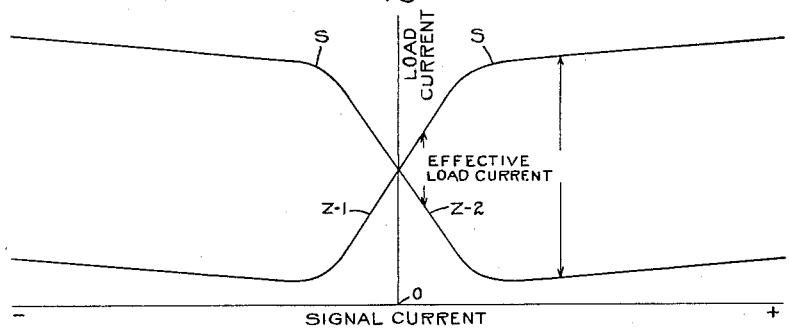

The circuits shown in Figs. 1, 2, and 3 all operate in a substantially identical manner which may be easily understood by reference to the curves of Figs. 1a and 1b. Referring to Fig. 1a, I have shown three groups of curves A, B, and C. The curves of group A represent the current in one impedance, such as Z–1, with relation to the current which would normally be produced through this impedance by a direct connection across the alternating voltage source 23. The curves of group B represent a similar portrayal of the current flow through impedance Z–2; while the curves of group C illustrate the resultant load current or flux due to the instantaneous differential of the currents flowing in the impedances Z–1 and Z–2. In groups A, B, and C the sinusoidal envelope represents the current that would normally flow through the impedances from the alternating voltage source if no saturable reactors were connected in series therewith. In the curves of groups A and B the heavy solid line indicates the current flow through the respective impedances Z–1 and Z–2 when no signal is supplied to the signal receiving terminals 24 and 25. The dashed lines represent the current flow through these impedances with a positive signal, and the dotted lines represent the current flow therethrough with a negative signal supplied to the input signal terminals. Similarly, in the curves of group C, the dashed line represents the resultant differential flux produced by these impedances due to a positive signal supplied to the control windings, while the dotted line represents the resultant differential flux due to a negative signal supplied thereto.

As indicated by the solid lines of groups A and B, with no signal on the control windings, the inductive effect of the reactance windings of each saturable reactor prevents the passage of current through the impedances Z–1 and Z–2 until approximately 90° of the source voltage cycle has elapsed. At this point saturation of the reactors is reached, and the current through the impedances builds up to follow substantially the source current for the remainder of the half cycle. If the impedances Z–1 and Z–2 and the reactors 11 and 12 are substantially identical, the magnitude and duration of current flow in each impedance will be approximately equal for each alternation. However, due to the reversed polarity of the series-connected current rectifying elements 19 through 22, the current in each impedance Z–1 and Z–2 reverses direction upon each alternation of source voltage. Since the field windings Z–1 and Z–2 of the load device 10 are connected in flux opposition, these equal currents produce equal and opposite magnetic flux, and, as a consequence, there is complete flux cancellation and no magnetic excitation of the motor 10.

Similarly, in the circuit of Fig. 2 the voltages developed across impedances Z–3 and Z–4 due to the resulting equal currents flowing therethrough with no signal are also equal, and the impedance points 26 and 27 are balanced. Consequently, no current flows through the bridge-connected load 10' of Fig. 2.

With the two stage magnetic amplifier circuit of Fig. 3, there is a similar cancellation of flux due to the equal currents flowing in the control windings Z–5 and Z–6 of the second stage of magnetic amplification 28 when no signal is supplied to the input terminals 24 and 25. However, a predetermined operating level of current flows through the bridge connected load 35 due to the passage of current permitted by the reactance windings 29 and 30 of this second stage of magnetic amplification 28. In any of the circuits of Figs. 1, 2, or 3, however, the control circuit of my invention has no effect upon its immediate load device in the absence of a signal supplied to the input signal receiving terminals 24 and 25.

If a signal in one direction, such as positive, is supplied to the signal receiving terminals 24 and 25, the resultant control flux in each reactor, due to their respective control windings 17 and 18 functions to accelerate the saturation of one of the reactors, such as reactor 11, while retarding the saturation of the other reactor, such as reactor 12. As a result, more current is passed by the reactance windings 13 and 14 associated with reactor 11 during their respective conducting periods than is passed by the reactance windings 15 and 16 associated with the reactor 12. As indicated by the dashed lines of the curves of groups A and B, the current flowing through impedance Z–1 is increased during the same positive alternation of source voltage that the current through impedance Z–2 is being decreased. During the succeeding negative alternation of source voltage, the current flowing through the impedance Z–1 is decreased while the current flowing through the impedance Z–2 is increased over the zero signal level. It will thus be seen that there is a preponderance of current flow in one impedance, such as Z–1, during positive alternations of the source voltage while there is a preponderance of current in the other impedance, such as Z–2, during negative alternations of source voltage. This shift in the preponderance of current flow during alternate half cycles of source voltage coincides with the shift in direction of the current flowing through these impedances due to the reversed polarity of the series-connected current rectifying elements 19 through 22. Consequently, the direction of effective flux predominance due to the current flowing in the impedances Z–1 and Z–2 is always the same.

The actual magnitude of the effective energizing flux, however, depends upon the duration of the time interval between the initial build-up of flux in one impedance and its subsequent cancellation by the build-up of flux in the other impedance. More specifically, since the impedances Z–1 and Z–2 are connected in flux opposition, the field due to the current in one impedance such as Z–2 functions to collapse the field due to the current in the other impedance Z–1 at a definite time interval during alternations of one polarity, such as positive, after the initial build-up of flux due to the current in the first impedance Z–1. The duration of the time interval between the build-up and the subsequent cancellation of the energizing field is, of course, dependent upon the amplitude of the input signal supplied to the control windings 17 and 18. The control action of the circuit, therefore, resembles the action of a phase-controlled amplifier, wherein the magnitude of the output control signal depends upon the duration of a phase-controlled current pulse, rather than that of the conventional amplitude-controlled amplifier. It is evident that the same flux relationships exist in the control windings Z–5 and Z–6 of the circuit of Fig. 3 as in the above-described field windings Z–1 and Z–2 of Fig. 1, and that this latter circuit functions in an identical manner in response to an input signal.

The circuit of Fig. 2 also operates in a similar manner. If a positive signal is supplied to the signal receiving terminals 24 and 25 of Fig. 2, the voltage developed across one of the impedances, such as Z–3 is greater than the voltage that is developed across the other impedance Z–4 during the source voltage alternations of one polarity, while the voltage developed across the latter impedance Z–4 is greater than that developed across the former impedance Z–3 during source voltage alternations of the opposite polarity. However, since the direction of current flowing through these impedances reverses during alternate half cycles, the voltage at one impedance point, such as point 26, is always greater than the voltage developed at the other impedance point 27. Consequently, current flows through the load 10' in the same direction for both alternations of source voltage. If, for example, the voltage at impedance point 26 is +20 while the voltage at impedance point 27 is +10 during positive alternations of source voltage, and the voltage at impedance point 26 is −10 while the voltage at impedance point 27 is −20 during the negative alternations of source voltage, then the impedance point 26 will always be 10 volts positive with respect to the impedance point 27. With a negative input signal, the direction of the predominating output energizing load current reverses relative to the direction which occurs when a positive signal is supplied to the input terminals. Therefore, the magnitude and direction of the output signal derived from my above-described control circuits of Figs. 1, 2, and 3 varies directly in accordance with the amplitude and polarity of a non-saturating input signal supplied to its control windings. The circuits will, of course, follow and amplify a non-saturating alternating voltage signal up to relatively high frequencies depending upon the permeability of the reactors and other well known frequency limiting parameters.

The phenomenon of simultaneous current flow through both impedances Z–1 and Z–2 described above, as well as the reversal in current flow through these impedances during each alternation of source voltage, provide many of the advantageous operating characteristics of my invention. Referring to Fig. 1b, I have shown a typical set of curves plotting the current through the impedances Z–1 and Z–2 as a function of signal current. As indicated by these curves, with zero signal current, equal currents flow through both impedances with the result that there is no differential voltage or flux to energize a load device associated therewith. However, with a small positive signal the current flowing through one impedance Z–1 increases very sharply while the current flowing through the other impedance Z-2 decreases at the same rate. Since the total effect energizing current is dependent upon the difference between the currents flowing in these impedances, maximum load current is approached extremely rapidly and linearly with increasing signal. Moreover, since the saturable reactors associated with each impedance reach maximum and minimum saturation at approximately the same time, the change from an increasing current to the maximum limited current is achieved in an abrupt manner. As a result, the limits of the range of control of an input signal are sharply defined. In addition, it will be perceived that as the signal is increased beyond a knee $s$ of the saturation curves of the reactors, the current in both impedances Z-1 and Z-2 continues to increase slightly. However, since the energizing field or current for the actual load of the circuit depends upon the difference between the currents flowing in these impedances Z-1 and Z-2 this enerizing current remains substantially constant regardless of the amplitude of signal current beyond these saturation limiting points $s$.

This differential field or current energization of the load also functions to minimize the effects of frequency variations, temperature variations, aging of components, and external parameters such as stray magnetic fields which normally affect both sides of this push-pull circuit to the same degree. A change in the saturation characteristic of one reactor or in the conduction of one pair of current rectifying members due to the effects of such influences would normally be compensated by a corresponding change in the saturation characteristic of the other reactor or in the conduction of the other pair of rectifying members.

This push-pull arrangement of my invention also functions to provide quick recovery from the effects of an unduly large signal. It will be appreciated that regardless of whether the large signal is positive or negative, at least one of the saturable reactors will have maximum flux density during each half cycle of source voltage. If the signal is suddenly reduced to a small value the collapse of the magnetic field in this saturable reactor will quickly reduce the current in the impedances connected thereto to bring about such fast recovery.

The reactance windings of any one saturable reactor, such as reactor 11, are preferably arranged on their respective core members so that, with a signal of one polarity such as positive, the flux due to one reactance winding during one alternation of source voltage is in a direction opposite to the flux produced by the other reactance winding during the succeeding alternation of source voltage. As a result, any residual magnetism due to the flux produced by conduction in one reactance winding is counteracted during the succeeding half cycle by the oppositely directed flux produced by the other reactance winding.

Referring now to Fig. 4, I have shown my invention as adapted for use as a constant current standard for electric voltage or current regulating systems. The circuit of Fig. 4 is identical with that of Fig. 2 with the exception that a bridge rectifier 36 is connected across the alternating voltage source to supply a large unidirectional signal to control windings 17 and 18 of the saturable reactors 11 and 12 respectively. The magnitude of this unidirectional signal supplied from this bridge rectifier must be large enough to drive one of the saturable reactors such as reactor 11 far into its magnetic saturation region. When in this large signal saturating region, small changes in signal voltage due to changes in the source voltage have relatively little effect upon the current passed by the reactance windings of either of the saturable reactors. In Fig. 4a I have shown a typical plot of the load current flowing through a direct current ammeter M1 connected across the impedance points 26 and 27 as against the voltage supplied from the source 23. As shown by this typical curve, plotted for a maximum signal current of 0.6 milliamp, the load current rises sharply for small initial increases in supply voltage, such as from zero to ten volts, and then remains substantially constant as the supply voltage is increased further. As will be seen from the curves of Fig. 1b, although the output of the bridge rectifier 36 varies with changes in supply voltage, it has no effect upon the differential output current of the circuit since one reactor is operating in its saturated region due to the initial large biasing signal. Therefore, with a normal operating supply voltage greater than 15 or 20 volts, any slight changes in the magnitude of this supply voltage have little or no effect upon the current flowing in the load circuit. This constant current source may be used in a conventional manner as a constant current reference standard in voltage or current regulating systems. It is also to be noted that a direct current ammeter, such as M2, connected in series with one of the load impedances, such as Z-3, also indicates a constant unidirectional component of current even though an alternating current is flowing through the impedance. This unidirectional current component flowing through the impedance Z-3 may also be filtered and used as a constant current reference standard in suitable regulating circuits.

Referring now to Fig. 5, I have shown my invention adapted for use as a converter of unidirectional signal of a given polarity to an alternating current output of a corresponding phase relative to the phase of the source voltage. This circuit is substantially identical to that of Fig. 1 with the exception that both reactance windings of each saturable reactor 11 and 12 respectively are separately connected to the same one of a pair of impedances Z-7 and Z-8 rather than to opposite ones thereof. The impedances Z-7 and Z-8 are shown as representing the field windings of a split two-phase alternating current motor, although it is apparent that they may comprise the magnetic excitation windings of any such alternating current load device. As shown by the curves of Fig. 5a, which are arranged in the same manner as the curves of Fig. 1a, a unidirectional signal of one particular polarity supplied to the control windings 17 and 18 produces an alternating resultant flux in the field windings Z-7 and Z-8 of a predetermined phase relative to the alternating voltage source. If the polarity of the unidirectional signal is reversed, the phase of this alternating resultant flux also reverses. It will be appreciated that this circuit may also be modified in a manner similar to that of Fig. 2 to enable its use in conjunction with any type of load rather than merely the field-excitation-type load shown in Fig. 5.

In Fig. 6 I have shown my invention as adapted for use as a discriminator of an alternating signal derived from the alternating voltage source. In this circuit, a pair of driving and driven selsyns 37 and 38 respectively are connected in a conventional manner such that the position of a rotor 39 of the driving selsyn 37 determines the magnitude and sense of an alternating voltage induced in a rotor winding 40 of the driven selsyn 38. It will be appreciated that this alternating voltage signal has a certain definite phase relative to the alternating voltage source, being either in phase or 180° out of phase therewith. The saturable reactor portion of this circuit enclosed within a dashed line 101 is identical with that of Fig. 5, but is connected to a pair of impedances Z-9 and Z-10 in a bridge circuit in a manner similar to that of Fig. 2. A load 41 is shown as being connected as the diagonal of this bridge and together with impedances Z-9 and Z-10 constitutes the output load network of the circuit of Fig. 6. As shown by the curves of Fig. 6a, which are portrayed in the same manner as the curves of Fig. 1a, an alternating signal voltage of one polarity produces a differential unidirectional current through the load 41 which has one particular polarity, while an alternating signal current of the opposite phase produces a unidirectional current in the load of an opposite polarity. The magnitude of this load current depends, of course, upon the amplitude of the alternating signal supplied to the control windings of the saturable reactors.

Figure 7:
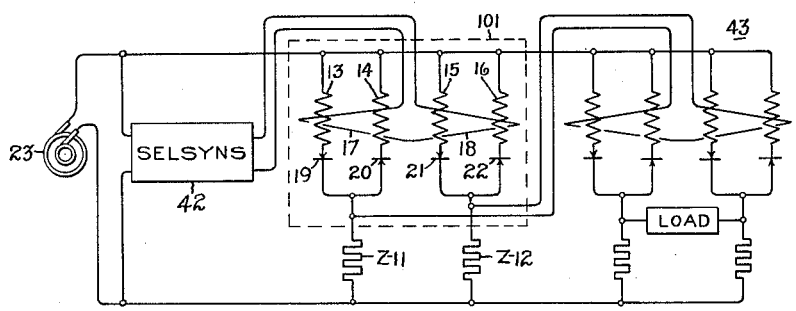
Fig. 7 is a circuit diagram showing the use of the circuit of Fig. 6 as a cascaded alternating current amplifier.

Referring now to Fig. 7, I have shown the magnetic amplifier of Fig. 6 as it might be used in cascade. In this circuit a selsyn system, designated generally by the numeral 42, is connected to supply an alternating signal to the control windings of a first stage of magnetic amplification identical with that shown in Fig. 6. The output differential voltage derived across a pair of bridge connected impedances Z–11 and Z–12 is used to drive the control windings of an additional stage of magnetic amplification 43 identical with that of the first stage. As explained in conjunction with Figs. 5 and 6, the output voltage of the first stage is a polarity sensitive unidirectional voltage which, when supplied to the signal windings of the second stage, produces an output voltage from this second stage which is alternating and in the same phase as the alternating signal supplied to the control windings of the first stage from the selsyn system.

In Fig. 8, I have shown a modification of the circuit of Fig. 7 whereby the necessity for the bridge connected impedances Z–11 and Z–12 of the first stage is eliminated by the use of an additional pair of control windings on the saturable reactors associated with a second stage 44. The operation of this circuit of Fig. 8 will be obvious to those skilled in the art from the foregoing description of the circuit of Fig. 7.

Referring to Fig. 9, I have shown a preferred unified structure for the saturable reactor portion of the above-described control circuits. Four centrally apertured quadrilateral individual core members 45 are arranged in radial fashion to form a central hub 45' around which a common control winding 46, representing both the control windings 17 and 18 of the foregoing circuit diagrams, is wound. Each reactance winding, 13 through 16, is wound on a respective one of the externally extending legs of these core members, one pair of reactance windings 13, 14 being reversely wound or connected relative to the other pair 15, 16 thereof. The rectifying members 19 through 22 may conveniently be located in the spaces available intermediate each pair of adjacent reactance windings. This structure forms the subject matter and is fully described and claimed in U. S. Patent No. 2,617,090, granted to Hugh M. Ogle on November 4, 1952, entitled "Saturable Reactor Apparatus" assigned to the same assignee as the present invention.

It is to be noted that in this unified star-shaped core structure shown in Fig. 9, the single control winding 46 serves the purpose of both control windings 17 and 18 of the circuits shown in Figs. 1 through 8. Moreover, negligible alternating current is induced in the control winding 46 to produce an undesirable reflection into a low impedance derived signal since the flux produced by the conducting one of each pair of reactance windings during successive alternations of source voltage is forced in opposite directions through the central unified hub upon which the control winding 46 is wound.

Figure 10:
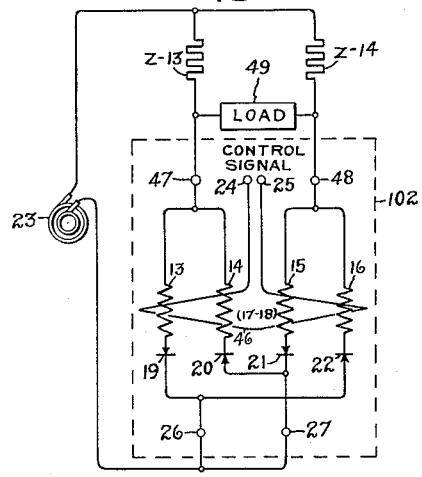
Fig. 10 is a circuit diagram showing the internal connections of the apparatus shown in Fig. 9.

A preferred internal circuit and terminal connection for the saturable reactor apparatus shown in Fig. 9 is illustrated within a dashed line 102 of Fig. 10. It will be observed that the internal connections within the dashed line 102 are identical with the connections within dashed line 100 of Figs. 1, 2, 3 and 4, with the exception that one side of each pair of reactance windings is connected to the same one of two terminals 47 and 48 rather than merely interconnected by a common conductor. This saturable reactor apparatus of Fig. 9, when connected with the terminal arrangement shown in Fig. 10, may be then used as a self-contained unit or "package" in any of the magnetic standard, magnetic amplifying, or magnetic inverting circuits shown in Figs. 1 through 8. It is evident that the apparatus enclosed within dashed line 102 of Fig. 10 may be employed in the same manner as the apparatus enclosed within the dashed line 100 of Figs. 1, 2, 3 and 4 by merely directly connecting the terminals 47 and 48 together and to the same side of the alternating voltage source. A load device would then be connected between terminals 26 and 27 in the same manner as shown in the circuits of these latter Figs. 1, 2, 3 and 4.

However, the manner of connecting this packaged apparatus designed within dashed line 102 in the discriminating or converting circuits of Figs. 5, 6, 7 and 8 is not so readily apparent and is, therefore, shown in Fig. 10. In this circuit (Fig. 10) a pair of substantially identical impedances Z–13 and Z–14 are respectively connected from each of the terminals 47 and 48 to one side of the alternating current source 23, and a load device 49 is connected between these terminals 47, 48 to be energized by the difference in voltage produced at these terminals. The terminals 26 and 27 which constituted output terminals in the circuits of Figs. 1, 2, 3 and 4 are now connected directly together and to the other side of the alternating current voltage source 23. It will be appreciated that this circuit of Fig. 10 is now identical with the circuit of Fig. 6 with the exception that the current rectifying members 19, 20, 21 and 22 are on opposite sides of their respectively associated reactance windings 13, 14, 15 and 16. Since these rectifiers and reactance windings are connected in series there is no electrical distinction between the two circuits and they operate in an identical manner. Each of the other circuits of Figs. 5, 7 and 8 may, of course, be modified in the same manner to accommodate this self-contained unit of Fig. 9.

It will thus be seen that I have provided a control circuit of the type using saturable reactors which may be used as a preamplifier of either alternating or unidirectional signals in magnetic amplifier systems, or may be easily modified for use as a direct or alternating current amplifier for any type of consumption circuit. In addition, this circuit may be used with a large magnetically biasing signal voltage as a constant current or voltage reference standard. Moreover, by making a slight change in the external circuit connection, the circuit may be used as either a discriminator or a converter of alternating to unidirectional currents and may be cascaded to provide greater amplification. By using the instantaneous differential currents flowing through a pair of impedances as the output energizing current of the circuit, the saturating characteristic of one saturable reactor is balanced against the other to provide high sensitivity to small signals, sharp limiting of the range of response, and fast recovery from unduly large signals. Moreover, changes in source voltage or frequency, as well as variations in the external conditions of operation of the circuit, are inherently compensated to minimize any resulting undesirable effects upon the circuit.

Although I have shown particular embodiments of my invention, it will be appreciated that many other modifications will occur to those skilled in the art. I intend, therefore, to cover by the appended claims all such modifications as fall within the true spirit and scope of my invention.

What I claim as new and desire to secure by Letters Patent of the United States is:

1. An electric control circuit for use with an alternating voltage source comprising saturable reactor apparatus having two pairs of reactance windings and means for controlling the level of magnetic saturation of said reactor apparatus in accord with an electric signal, each reactance winding of each said pairs being connected in parallel with a reactance winding of the opposite pair, an output network including a pair of impedances each connected in separate series circuit relation with a respective parallel connected two of the four reactance windings and each said series circuits adapted to be connected across a same alternating voltage source, separate current rectifying means in circuit relation with each reactance winding and poled to provide simultaneous currents flowing in both impedances which reverse direction together with the alternations in polarity of an interconnected alternating voltage source, each said pair of reactance windings being connected in reversed flux relation with respect to said control means whereby an electric signal supplied to said control means retards the reactor saturation caused by one reactance winding pair while accelerating the reactor saturation caused by the other reactance winding pair to provide a difference in current flowing in said impedances which varies during each source voltage alternation in accord with the magnitude of an electric signal supplied to said control means, said load network being energized in response to said current difference.

2. An electric control circuit for use with an alternating voltage source comprising saturable reactor apparatus having two pairs of reactance windings and at least one signal receiving magnetic level saturation control winding, each reactance winding of each said pairs being connected in parallel with a reactance winding of the opposite pair, a load device having a pair of excitation windings each connected in separate series circuit relation with a respective parallel connected two of the four reactance windings and each said series circuits adapted to be connected across a same alternating voltage source, said load device being energized in accordance with the difference in current flowing in said excitation windings, separate current rectifying means in circuit relation with each of the four reactance windings and poled to provide simultaneous currents flowing in both excitation windings which reverse direction together with the alternations in polarity of a source voltage connected across said series circuits, each said pair of reactance windings being connected in reversed flux relation with respect to said control winding whereby an electric signal supplied to said control winding retards the reactor saturation caused by one reactance winding pair while accelerating the reactor saturation caused by the other reactance winding pair to provide an instantaneous difference in current flowing in said impedances which varies in accordance with the magnitude of an electric signal supplied to said control winding.

3. An electric control circuit for use with an alternating voltage source comprising saturable reactor apparatus having two pairs of reactance windings and at least one signal receiving magnetic saturation control winding, each reactance winding of each said pairs being connected in parallel with a reactance winding of the opposite pair, a pair of impedances each connected in separate series circuit relation with the respective parallel connected two of said four reactance windings and each said series circuits being adapted to be connected across a same alternating voltage source, and four current rectifying members each connected in circuit relation with a respective one of the reactance windings, the rectifying members in circuit relation with parallel connected reactance windings being reversely poled to provide simultaneous currents flowing in both impedances which reverse direction together with the alternations in polarity of a source voltage connected across said series circuits, and a load device connected to be energized in accordance with the instantaneous difference in voltage developed across said impedances by currents flowing therein, each said pair of reactance windings being connected in reversed flux relation with respect to said control winding whereby an electric signal supplied to said control winding retards the reactor saturation caused by one pair of reactance windings while accelerating the reactor saturation caused by the other pair thereof to vary said instantaneous voltage difference across said impedances in accord wtih the magnitude of an electric signal supplied to said control winding.

4. An electric control circuit for use with an alternating voltage source comprising a pair of impedances, saturable reactor apparatus having two pairs of reactance windings and at least one signal receiving saturation control winding, one reactance winding of each said pair thereof being separately connected in parallel with each other and in series circuit relation with one of said impedances, and the other reactance winding of each said pair thereof being separately connected in parallel with each other and in series circuit relation with the other said impedance, and each said series circuits being adapted to be connected across a same alternating voltage source, separate rectifiers in circuit relation with each reactance winding and poled to provide simultaneous currents flowing in both impedances which reverse direction together with alternations in polarity of a voltage source connected across said series circuits, each said pair of reactance windings being connected in reversed flux relation with respect to said control winding whereby an electric signal supplied to said control winding retards the reactor saturation caused by one pair of reactance windings while accelerating the reactor saturation caused by the other pair thereof to provide a difference in current flowing in said impedances which varies in accordance with the magnitude and polarity of an electric signal supplied to said control winding.

5. The control circuit of claim 4 wherein means are included for supplying a unidirectional signal voltage to the signal receiving control winding of a magnitude sufficient to bias said reactor apparatus beyond its magnetic saturating point.

6. The control circuit of claim 4 wherein the substantially identical impedances constitute a pair of saturation control windings of a stage of magnetic amplification.

7. The control circuit of claim 4 wherein the substantially identical impedances constitute a pair of magnetic excitation windings of a dynamoelectric device.

8. An electric control circuit for use with an alternating voltage source comprising a saturable reactor including a four cornered star-shaped core member having four outer legs and a central unified hub, a reactance winding on each outer leg and a saturation control winding on said hub, a first two of the four reactance windings being connected in parallel and a second two of the reactance windings being connected in parallel, an output load network including a pair of substantially identical impedances each connected in separate series circuit relation with a respective parallel connected two of the four reactance windings and each said series circuits being adapted to be connected across a same alternating voltage source, separate rectifiers in circuit relation with each reactance winding and poled to provide simultaneous currents flowing in both impedances which reverse direction together with the alternations in polarity of an interconnected alternating voltage source, each of two pairs of said reactance windings being connected in reversed flux relation with respect to said control winding whereby an electric signal supplied to said control winding retards the reactor saturation caused by one pair of reactance windings while accelerating the reactor saturation caused by the other pair thereof, thereby to provide an instantaneous difference in current flowing in said impedances which varies during each alternation in accord with the magnitude of an electric signal supplied to said control winding, said load network being energized in response to said instantaneous differential current.

9. An electric control circuit for use with an alternating voltage source comprising a pair of substantially identical impedances, a saturable reactor including a four cornered star-shaped core member having four outer legs and a central unified hub, a separate reactance winding on each of said four outer legs and a saturation control winding on said central unified hub, one reactance winding of each of two pairs thereof being connected in parallel with each other and in series circuit relation with one of said impedances, and the other winding of each said pair thereof being connected in parallel with each other and in series circuit relation with the other impedance, and each said series circuits being adapted to be connected across a same alternating voltage source, four rectifiers each connected in circuit relation with a respective one of said reactance windings, the rectifiers in circuit relation with parallel connected reactance windings being reversely poled to provide simultaneous currents flowing in both impedances which reverse direction together with the alternations in polarity of an alternating source voltage connected across said series circuits, and each said pair of reactance windings being connected in reversed flux relation with respect to said control winding whereby an electric signal supplied to said control winding retards the reactor saturation caused by one pair of reactance windings while accelerating the reactor saturation caused by the other pair thereof to produce a difference in current flowing in said impedances which varies in accord with the magnitude and polarity of an electric signal supplied to said control winding.

10. An electric control circuit for use with an alternating voltage source comprising a saturable reactor including a four cornered star-shaped core member having four outer legs and a central unified hub, a separate reactance winding on each of said four outer legs and a saturation control winding on said central hub, a pair of substantially identical impedances, one pair of reactance windings being connected in parallel with each other and in series with one of said impedances, and the other pair of reactance windings being connected in parallel with each other and in series with the other one of said impedances, and each said series circuits being adapted to be connected across a same alternating voltage source, four rectifiers each connected in circuit relation with a respective one of said reactance windings, the rectifiers in circuit relation with each said pair of reactance windings being reversely poled to provide simultaneous currents flowing in both impedances which reverse direction together with the alternations in polarity of an interconnected alternating voltage source, each said pair of reactance windings being connected in reverse flux relation with respect to said control winding whereby an electric signal supplied to said control means retards the reactor saturation caused by one pair of reactance windings while accelerating the reactor saturation caused by the other thereof, and means to supply an alternating signal voltage to said control windings derived from said alternating voltage source to produce a unidirectional preponderance of current in said impedances whose polarity and amplitude varies in accordance with the sense and magnitude of said alternating signal voltage supplied to said control winding.

11. In combination, an alternating voltage source, a pair of impedances, saturable reactor apparatus having two pairs of reactance windings and at least one saturation control winding, one reactance winding of each said pair thereof being separately connected in parallel with each other and in series circuit relation with one of said impedances across said alternating voltage source, and the other reactance winding of each said pair thereof being separately connected in parallel with each other and in series circuit relation with the other impedance across said alternating voltage source, current rectifying means in circuit relation with each reactance winding and reversely poled with respect to each pair thereof to enable current to flow in both impedances during both alternations of source voltage but to reverse direction together with the alternations in polarity thereof, and each said pair of reactance windings being connected in reversed flux relation with respect to said control winding whereby an electric signal supplied to said control winding retards the reactor saturation caused by one pair of reactance windings while accelerating the reactor saturation caused by the other pair thereof to produce an instantaneous difference in current flowing in said impedances which varies during each alternation in accord with the magnitude and phase of an electric signal supplied to said control means.

12. An electric control circuit for use with an alternating voltage source comprising a load device having a pair of substantially identical impedances, said load device being energized in accordance with the difference in current flowing in said impedances, a pair of saturable reactors each having a pair of reactance windings and a saturation control winding, each reactance winding of each of said pairs being connected in parallel with a reactance winding of the opposite pair, each of said impedances being connected in separate series circuit relation with each of a respective parallel connected two of said reactance windings across said alternating voltage source, and current rectifying means in circuit relation with each reactance winding and reversely poled with respect to the reactance windings associated with each reactor to enable current from said source to flow in both impedances during each alternation of polarity of said source but to reverse direction together with the alternations thereof, said control windings being connected in series and in reversed flux relation with respect to said reactors to retard the saturation of one reactor while accelerating the saturation of the other reactor in response to a signal voltage connected in series with said control windings, whereby the difference in current flowing in said impedances varies in accordance with the amplitude of a signal voltage supplied to said control windings.

13. In combination, an alternating voltage source, a load device having a pair of excitation windings, a pair of saturable reactors each having a pair of reactance windings and a saturation control winding, one reactance winding of each said pair thereof being separately connected in parallel with each other and in series circuit relation with one of said excitation windings across said alternating voltage source, and the other reactance winding of each said pair thereof being separately connected in parallel with each other and in series circuit relation with the other excitation winding across said alternating voltage source, current rectifying means in circuit relation with each reactance winding and reversely poled with respect to each pair thereof to enable current to flow in each excitation winding during both alternations of source voltage but to reverse direction together with the alternations in polarity thereof, and a pair of signal receiving terminals, said control windings being connected in series across said terminals and arranged to retard the saturation of one of said reactors while accelerating the saturation of the other of said reactors in response to a signal voltage supplied to said terminals whereby said load device may be energized by a relative preponderance of flux produced by current in said excitation windings varying in accordance with the magnitude and polarity of said signal voltage.

14. The combination of claim 13 including rectifying means connected to supply to the signal receiving terminals a reactor saturating unidirectional signal derived from said alternating voltage source.

15. An electric control circuit for use with an alternating voltage source comprising a pair of output terminals, a pair of substantially identical impedances each adapted to be separately connected from one side of said alternating voltage source to a different one of said output terminals, a pair of saturable reactors each having a pair of reactance windings and a saturation control winding, one reactance winding in each pair thereof being adapted to be connected from the other side of said source in parallel circuit relation with each other to one output terminal, and the other reactance winding in each pair thereof being adapted to be connected from said other side of said source in parallel circuit relation with each other to the other output terminal, current rectifying means in circuit relation with each reactance winding and reversely poled with respect to each pair thereof to enable current from said source to flow in each impedance during both alternations of source voltage but to reverse direction together with the alternations in polarity thereof, said control windings being connected in series and in reversed flux relation with respect to said reactors to retard the saturation of one of said reactors while accelerating the saturation of the other of said reactors in response to a signal voltage supplied in series therewith, whereby the amplitude and polarity of the difference in voltage between said output terminals varies in accordance with said signal voltage.

References Cited in the file of this patent

UNITED STATES PATENTS

| | | |
|---|---|---|
| 1,479,561 | Stoekle | Jan. 1, 1924 |
| 2,126,790 | Logan | Aug. 16, 1938 |
| 2,169,093 | Edwards | Aug. 8, 1939 |
| 2,229,952 | Whitely et al. | Jan. 28, 1941 |
| 2,414,936 | Edwards et al. | Jan. 28, 1947 |
| 2,453,470 | Steinitz | Nov. 9, 1948 |
| 2,509,738 | Lord | May 30, 1950 |
| 2,509,864 | Hedstrom | May 30, 1950 |
| 2,512,317 | Edwards et al. | June 20, 1950 |
| 2,518,865 | Cartotto | Aug. 15, 1950 |

FOREIGN PATENTS

| | | |
|---|---|---|
| 226,104 | Switzerland | June 16, 1943 |